United States Patent [19]

Zimmerman

[11] Patent Number: 5,527,106
[45] Date of Patent: Jun. 18, 1996

[54] RETRUDER

[75] Inventor: Anton Zimmerman, Muhledorf, Switzerland

[73] Assignee: Antogi AG, Mauren, Liechtenstein

[21] Appl. No.: 211,008

[22] PCT Filed: Jul. 23, 1993

[86] PCT No.: PCT/CH93/00186

§ 371 Date: Jul. 18, 1994

§ 102(e) Date: Jul. 18, 1994

[87] PCT Pub. No.: WO94/02303

PCT Pub. Date: Feb. 3, 1994

[30] Foreign Application Priority Data

Jul. 23, 1992 [CH] Switzerland .................. 2321/927

[51] Int. Cl.⁶ ............................................. B29B 1/10
[52] U.S. Cl. .................................. 366/85; 366/321
[58] Field of Search ..................... 366/85, 97, 98, 366/88, 300, 301, 322, 321, 306; 925/208, 209

[56] References Cited

U.S. PATENT DOCUMENTS

| | | |
|---|---|---|
| 2,765,490 | 10/1956 | Zona . |
| 3,577,588 | 4/1971 | Keine . |
| 3,702,691 | 11/1972 | Fritsch . |
| 3,742,093 | 6/1973 | Skidmore . |
| 3,764,118 | 10/1973 | Matsuoka .................. 366/88 |
| 3,874,090 | 4/1975 | McCracken . |
| 4,474,475 | 10/1984 | Moriyama .................. 366/97 |
| 4,959,186 | 9/1990 | Dollhopf . |

FOREIGN PATENT DOCUMENTS

| | | |
|---|---|---|
| 0165093 | 12/1985 | European Pat. Off. . |
| 2117997 | 10/1971 | Germany . |
| 1514623 | 10/1989 | U.S.S.R. .................. 366/85 |
| 1125775 | 9/1964 | United Kingdom . |

Primary Examiner—Robert W. Jenkins
Attorney, Agent, or Firm—Darby & Darby

[57] ABSTRACT

A retruder (reverse extruder) (1) having at least one housing, with charging (10) and removal (11) ports, and at least two mutually meshing reversible screws (2, 3) running in opposite directions (12, 13) and conveying the medium at the same time in the direction (14) of conveying and in the reverse direction (15). The reversal of thrust reduces the axial bearing load on the reversible screws (2, 3) and the pressure on the bearing seals. This makes it possible to increase the conveying pressure and to increase the frictional forces of such machines without reducing the service life and the availability thereof.

11 Claims, 2 Drawing Sheets

RETRUDER

BACKGROUND OF THE INVENTION

The invention relates to a retruder for continuously conveying, mixing and/or kneading media at elevated pressure. The term extruder has become established for apparatus of a similar type. This term is fundamentally incorrect for the present invention, because of the reversal of the direction of conveying, instead of a circumlocution the abbreviation retruder (reverse extruder) is proposed.

Continuous conveying, mixing and/or kneading of media is part of the basic operations of process engineering. The material for mixing and/or conveying can be very different substances. The chemical and physical properties of these substances, their state of aggregation and their behaviour under pressure and heat can be correspondingly different. The solutions provided by the engineering of the prior art, which extend from kneading chocolate composition, producing semifinished plastics by extrusion and processing flowable plastics granules with a glass fibre content for injection moulding to the disposal of biologically active waste, correspond to this variety.

For all these tasks there are known machines which have, depending on the requirements, cooled or heated housings and at least two rotating, mutually meshing conveying screws which produce a pressure build-up by forcibly conveying the medium in the individual, closed windings of the screw channel, without having a reactive effect on the mass transport. The seals and the bearings are the weak points of these constructions, since the conveying pressure produces high axial pressures. In particular, this disadvantage becomes important when processing abrasive media or when the high pressures in the medium for the purpose of increasing the frictional forces in the medium are themselves advantageous. This is the case with kneading tasks if the efficiency of kneading is increased or for example in the case of a frictional reactor which is to be operated as a thermo-mechanical process unit for preparing biomass, at high operating pressures.

OBJECT OF THE INVENTION

The object of the present invention is to enable and to increase the pressure build-up and the frictional forces within the medium of a machine having at least two rotating, mutually meshing conveying screws forcibly conveying the medium in the screw channel without the disadvantageous consequences for the bearing seals and for the bearings.

The advantages achieved by the invention reside substantially in the increase in the kneading output, the service life and the availability of forcible conveyors for existing tasks and moreover the possibility of providing new processes. This is due to the increase in the permissible conveying pressure in accordance with the prior art.

BRIEF DESCRIPTION OF THE DRAWINGS

The invention will be described by way of example with reference to the attached diagrammatic drawings, in which.

DETAILED DESCRIPTION OF THE INVENTION

Figure 1:
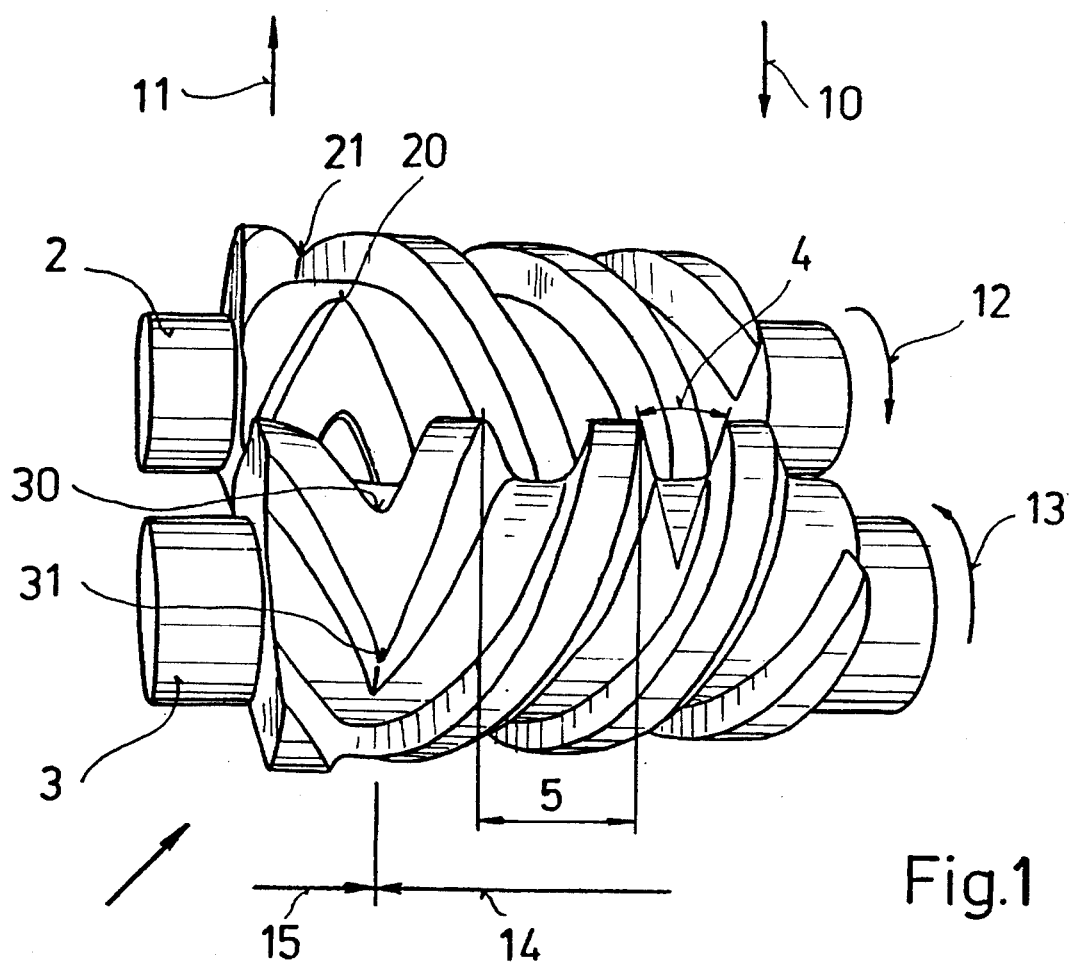
FIG. 1 shows the perspective illustration of the screws of a retruder.

The retruder 1 in FIG. 1 is illustrated without a housing and only shows the two mutually meshing reversible screws 2, 3. The term "reversible screw" indicates the particular property of these screws, since both reversible screws change their direction 14 of conveying to the reverse direction 15 by the inversion of the pitch angles, which is a function of the pitch 5 and the circumference of one of the two reversible screws 2, 3, in the region of the reversing points 20, 21 and/or 30, 31. The absolute values of the pitch in the region of the direction 14 of conveying and the pitch of the reverse direction 15 can be different depending on requirements. A further important property of the two reversible screws 2, 3 is the fact that they rotate in opposite directions 12, 13 and in meshing manner. In the region of the reversing points 20, 30 and 21, 31 of the reversible screws 2, 3 the meshing is performed such that the reversing windings of the reversible screws 2, 3 roll on one another in the manner of double helical gearwheels.

The depth of the screw channel (the difference between the external radius of a screw and the core radius of the respective one of the reversible screws 2, 3) and the flank angle 4 form the cross-section of the screw channel as a function of the pitch angle. The cross-section of the screw channel can decrease with the flank angle 4 in the direction 14 of conveying and cause an increasing compression of the medium.

Figure 2:
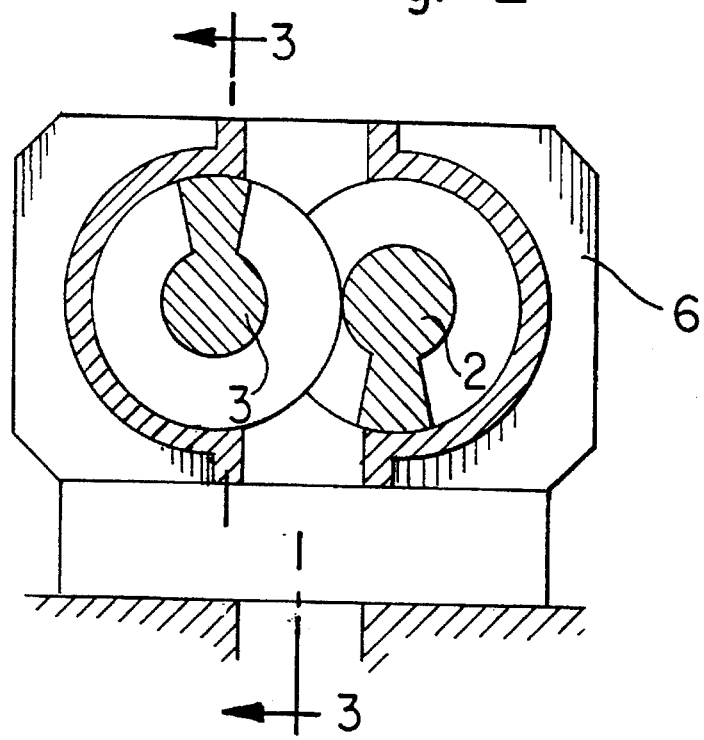
FIG. 2 is an end view of the retruder.
Figure 3:
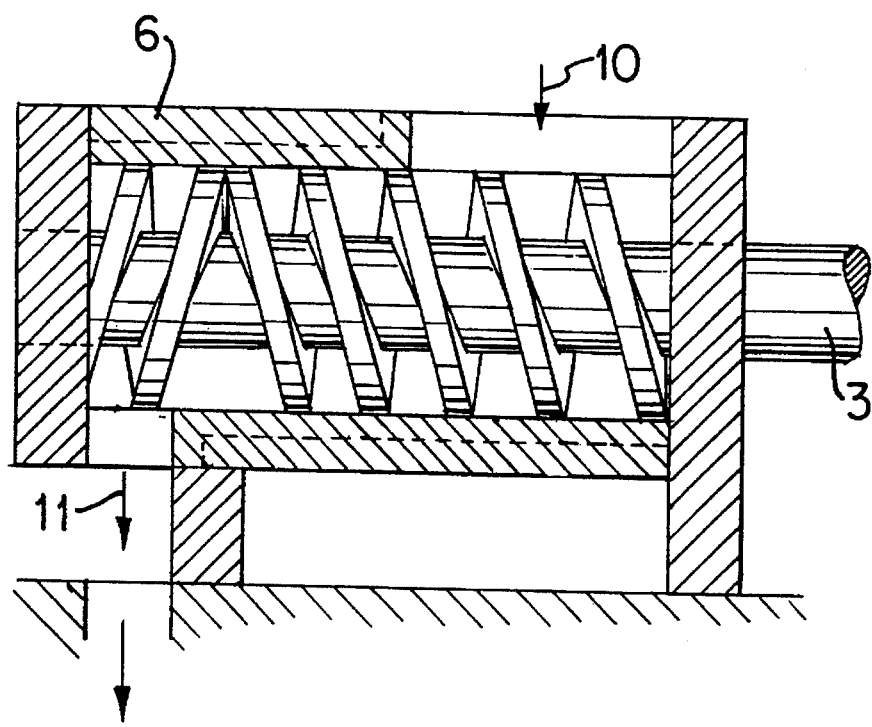
FIG. 3 is a cross-sectional view.

FIGS. 2 and 3 show the screws 3, 4 within a housing 6 having a charging (inlet) port 10 and a discharge port 11, spaced along the length of the housing.

From charging port 10, the medium passes into the screw channel of the reversible screws 2, 3 and is conveyed as a result of the rotation in opposite directions forcibly in the individual turns, which are closed by the windings of the screw channel, the housing 6 inner wall and the meshing screw, as far as the reversing points 20, 30 and 21, 31 in accordance with the direction 14 of conveying. The mass transport conveyed in the reverse direction 15 presses against this mass flow from the plane of rotation of the common reversing points 20, 30 and 21, 31. Depending on the counter-pressure of the reverse direction, the frictional force in the medium is increased and the axial load on the screw bearings is reduced. The progressively decreasing flank angles of the reverse direction 15 allow the mass transport of the medium to advance to the removal port 11. It should be noted that discharge port 11 is generally transverse to the longitudinal axes of the screws. In an extruder, the discharge port is generally in line with the screw axes. As shown in the drawings, the inlet and discharge ports 10, 11 are diametrically spaced. Because of the counter-pressure in the reverse direction 15, the pressure on the seals of the adjacent bearings is considerably reduced so that the risk of damage to the bearings is correspondingly lessened.

The mass flow of the retruder 1 permits charging 10 and removal 11 perpendicular to the reversible screws 2, 3. Depending on the wish of the user, charging 10 and removal 11 can be in opposite from what is illustrated, or indeed lie along the same line (not illustrated). Depending on requirements, the housing of the retruder 1 can be provided with a casing which is common and/or divided as desired and which permits heating and/or cooling of the retruder. Finally, the possibility of forming the reversible screws as a monobloc should also be pointed out. Thanks to this robust construction of the retruder, common sense will set the limits on output.

I claim:

1. A retruder comprising:

a housing having an inlet port for receiving material being processed and an outlet port for discharging material spaced from the inlet port along the length of the housing;

a pair of elongated screws in said housing rotating in opposite directions;

each said screw having a helical thread thereon and running in opposite directions from a point along the respective screw, said threads mutually meshing and conveying material being passed from the inlet along the length of the screws toward the outlet and then in a reverse direction back toward the inlet.

2. Retruder according to claim 1, wherein the pitch of the thread of a screw increases and decreases progressively along the length of the screw in dependence on the direction of conveying of the material.

3. Retruder according to claim 1 wherein each of the screws is made in one piece as a monobloc.

4. Retruder according to claim 1 wherein the pitch of the thread of each of the screws is different in the direction of conveying of material and in the reverse direction.

5. Retruder according to claim 1 wherein the reversible screws are mounted at only one end of the housing.

6. Retruder according to claim 1 wherein the reversible screws are mounted at each end of the housing.

7. Retruder according to claim 1 wherein the depth of the channel between the outer edge and the root of the threads of the reversible screws tapers off in the respective direction of material conveying.

8. Retruder according to claim 1 wherein the housing has at least one cooling jacket.

9. Retruder according to claim 1 wherein the housing has at least one heating jacket.

10. Retruder according to claim 1 further comprising a continuously variable drive for the screws.

11. A retruder as in claim 1 wherein said housing outlet port is generally transverse to the longitudinal axes of the screws.

* * * * *